(12) United States Patent
Hohaus et al.

(10) Patent No.: US 10,832,582 B2
(45) Date of Patent: Nov. 10, 2020

(54) MONITORING LOW-FLYING AIRPLANES

(71) Applicant: QUANTEC GRUND GMBH & CO. KG, Goslar (DE)

(72) Inventors: Lars Hohaus, Goslar (DE); Vincent Keßler, Hannover (DE); Alexander Gerdes, Hannover (DE)

(73) Assignee: QUANTEC GRUND GMBH & CO. KG, Goslar (DE)

( * ) Notice: Subject to any disclaimer, the term of this patent is extended or adjusted under 35 U.S.C. 154(b) by 295 days.

(21) Appl. No.: 15/769,353

(22) PCT Filed: Oct. 24, 2016

(86) PCT No.: PCT/EP2016/075580
§ 371 (c)(1),
(2) Date: May 29, 2018

(87) PCT Pub. No.: WO2017/068193
PCT Pub. Date: Apr. 27, 2017

(65) Prior Publication Data
US 2018/0315325 A1 Nov. 1, 2018

(30) Foreign Application Priority Data
Oct. 22, 2015 (DE) .......... 10 2015 118 028

(51) Int. Cl.
G08G 5/04 (2006.01)
G08G 5/00 (2006.01)
(Continued)

(52) U.S. Cl.
CPC ............. G08G 5/04 (2013.01); F03D 7/0264 (2013.01); F03D 80/10 (2016.05);
(Continued)

(58) Field of Classification Search
CPC ........ G08G 5/04; G08G 5/0082; F03D 80/10; F03D 7/0264; G01S 13/0218; G01S 13/91; F05B 2270/805; Y02E 10/72
See application file for complete search history.

(56) References Cited

U.S. PATENT DOCUMENTS

| | | | |
|---|---|---|---|
| 5,774,088 A * | 6/1998 | Kreithen | A01K 15/02 342/22 |
| 7,876,260 B2 * | 1/2011 | Laufer | G01S 7/003 342/61 |

(Continued)

FOREIGN PATENT DOCUMENTS

| | | | |
|---|---|---|---|
| DE | 20 2011 050 547 U1 | 12/2011 | |
| WO | 2015/065253 A1 | 5/2015 | |
| WO | WO-2015065253 A1 * | 5/2015 | ............. F03D 80/10 |

*Primary Examiner* — Peter M Bythrow
(74) *Attorney, Agent, or Firm* — W&C IP

(57) ABSTRACT

The invention relates to a system for actuating signal transmitters that are arranged on aviation obstacles, which are obstacles for low-flying airplanes, and signal transmitters for optically warning the airplanes or the pilots thereof, having the following features: a) at least one large-area radar system which is designed to detect airplanes flying at very low altitudes and which is arranged at a location remote from the aviation obstacles, b) at least one computer device which is coupled to the large-area radar system so as to transmit signals and which is designed to evaluate the data provided by the large-area radar system, said data relating to detected airplanes, and to provide such data to other systems via a data connection, and c) at least one data connection between the computer device and multiple aviation obstacles and/or groups of aviation obstacles, wherein d) the computer device is designed to output activation signals for the signal transmitters of aviation obstacles which are being approached by an airplane flying at a low altitude on the basis of the data transmitted by the large-area radar system. The invention (Continued)

further relates to a system for providing data relating to airplanes flying at very low altitudes, to a device comprising a signal transmitter device for aviation obstacles, and to a corresponding actuation device.

16 Claims, 4 Drawing Sheets

(51) Int. Cl.
    *F03D 80/10*     (2016.01)
    *G01S 13/91*     (2006.01)
    *F03D 7/02*     (2006.01)
    *G01S 13/02*     (2006.01)

(52) U.S. Cl.
    CPC .......... *G01S 13/0218* (2013.01); *G01S 13/91* (2013.01); *G08G 5/0082* (2013.01); *F05B 2270/805* (2013.01); *Y02E 10/72* (2013.01)

(56) References Cited

U.S. PATENT DOCUMENTS

| | | | |
|---|---|---|---|
| 7,982,659 B2 * | 7/2011 | Laufer | G01S 13/87 342/61 |
| 8,482,435 B2 * | 7/2013 | Wobben | F03D 80/10 340/983 |
| 8,598,998 B2 * | 12/2013 | Vassilev | A01M 29/16 340/384.2 |
| 8,659,439 B2 * | 2/2014 | Carstensen | F03D 80/10 340/601 |
| 8,665,138 B2 * | 3/2014 | Laufer | F03D 80/10 342/61 |
| 8,742,977 B1 * | 6/2014 | Piesinger | A01M 29/16 342/159 |
| 8,860,601 B2 * | 10/2014 | Hol | G01S 13/04 342/25 F |
| 9,013,331 B2 * | 4/2015 | Wise | F21V 7/041 340/961 |
| 9,253,847 B2 * | 2/2016 | Zhai | H05B 45/10 |
| 9,341,706 B2 * | 5/2016 | Ward | G01S 7/414 |
| 9,416,769 B2 * | 8/2016 | Nielsen | F03D 17/00 |
| 9,474,265 B2 * | 10/2016 | Duncan | B64C 39/024 |
| 9,581,165 B2 * | 2/2017 | Babbitt | A01K 11/006 |
| 9,745,961 B2 * | 8/2017 | Quell | G08B 5/38 |
| 9,775,337 B2 * | 10/2017 | Duncan | A01M 29/18 |
| 9,804,262 B2 * | 10/2017 | Fun | G01S 13/951 |
| 9,856,856 B2 * | 1/2018 | Wenger | F03D 80/10 |
| 10,275,679 B2 * | 4/2019 | Jorquera | G06T 7/13 |
| 2009/0034259 A1 * | 2/2009 | Laufer | F03D 80/10 362/253 |
| 2013/0279162 A1 * | 10/2013 | Hohaus | F21S 8/00 362/231 |
| 2015/0010399 A1 * | 1/2015 | Bahat | A01M 29/08 416/1 |
| 2016/0055400 A1 * | 2/2016 | Jorquera | H04N 5/23296 416/1 |

\* cited by examiner

MONITORING LOW-FLYING AIRPLANES

The invention concerns a system for actuating signal transmitters disposed on aviation obstacles, further a system for providing data about airplanes at very low flying altitudes and a device with a signal transmission unit for aviation obstacles and an actuating unit for this.

In general, the invention concerns the detection of airplanes at low flying altitudes, for example low-flying helicopters or sports airplanes. The detection of data of such airplanes and the provision thereof can for example be used for the actuation of signal transmitters on aviation obstacles, i.e. for example the timely switch-on of lighting installations that are not operated continuously on wind power systems.

There are already proposals, for example DE 20 2004 006 595 U1 or DE 20 2011 050 703 U1, for controlling the illumination of wind power systems on demand using the detection of airplanes by a radar system disposed locally near the wind power system or a wind farm. The associated technical and financial costs are relatively high, especially for an individual wind power system or a small wind farm.

It is therefore the object of the invention to fundamentally improve the detection of low-flying airplanes from a technical and economic viewpoint and to specify advantageous applications for this.

This object is achieved according to claim 1 by a system for actuating signal transmitters that are disposed on aviation obstacles, which are obstacles for low-flying airplanes and which comprise signal transmitters for optically warning the airplanes or the pilots thereof, with the following features:
  a) at least one large-area radar system that is arranged for the detection of airplanes at low flying altitudes and that is disposed at a point that is remote from the aviation obstacles,
  b) at least one computer device that is coupled to the large-area radar system for signal transmission and that is arranged for analysis of the data provided by the large-area radar system about detected airplanes and for providing such data to other systems via a data connection,
  c) at least one data connection between the computer device and a plurality of aviation obstacles and/or groups of aviation obstacles,
  d) wherein the computer device is arranged to output switch-on signals for the signal transmitters of such aviation obstacles that are approached by airplanes at a low flying altitude depending on the data transmitted by the large-area radar system.

Aviation obstacles in this context are for example wind power systems, in particular the towers and rotors thereof, but also other relatively high structures, for example skyscrapers, towers and other masts, and tall technical devices such as for example cranes. Aviation obstacles of this type are also referred to as flight obstacles. The aviation obstacles must be identified with signal transmitters, in particular optical signal transmitters for optically warning the aircraft or the pilots thereof in order to prevent collisions. Signal transmitters of this type are also referred to as navigation lighting installations or only navigation lights.

A group of aviation obstacles can for example be a wind farm.

In marked contrast to the prior art, with this a centralized radar monitoring approach for the detection of airplanes at low flying altitudes is proposed. The large-area radar system that is essential for the invention can detect very large areas with a single radar station or a few radar stations distributed over a large region to be monitored that are coupled to each other. Thus for example, a federal state such as Schleswig-Holstein or Lower Saxony can be monitored with only one or two radar stations. But airspace monitoring at sea, for example for offshore-wind farms, can be significantly optimized with the invention. For example, in Heligoland practically the entire North Sea area in which offshore wind farms are present or planned can be monitored by means of a single radar station.

Accordingly, the invention provides the technical advantage compared to the prior art that lower cost of equipment-related installation and maintenance is necessary. Thus, significant economic advantages accompany this. By the centralized arrangement of one or a few radar stations of the large-area radar system, in particular at a point that is remote from the aviation obstacles, the cost for the installation of the system is reduced to significantly lower cost per wind farm or per wind power system. In addition, the maintenance costs are much more distributed, so that the maintenance costs per wind farm or wind power system are considerably lower. The large-area radar system can also be operated by an independent company that is not an operator of wind power systems, and in this way the necessary switch-on signals for the signal transmitters of the aviation obstacles can be provided as a service.

The computer device can be embodied in the form of an individual central computer device or as distributed computer devices with a plurality of individual computers. The computer device or the individual computers thereof can each be spatially and/or functionally associated with a radar station of the large-area radar system, i.e. can be disposed there, but they can also be wholly or partly disposed at a point remote from there.

The data connection between the computer device and the aviation obstacles can for example be embodied as a WAN connection (WAN—Wide Area Network), for example in the context of an Internet. The connection can also be embodied as a direct or indirect radio connection, for example via relay stations. A combination can also be provided, for example a WAN connection for coupling to one aviation obstacle and/or group of aviation obstacles and a radio connection to another aviation obstacle and/or group of aviation obstacles.

According to an advantageous development of the invention, the computer device is arranged to monitor different non-intersecting and non-mutually adjacent geographic areas for airplanes at a low flying altitude using the data transmitted by the large-area radar system. This has the advantage that by means of the computer device the data can already be preselected to provide the switch-on signals on demand to only defined aviation obstacles or groups thereof, namely where approaching airplanes at a low flying altitude are detected.

The computer device can for example monitor the area in a specified radius about an aviation obstacle or a group of aviation obstacles and output a switch-on signal for signal transmitters of such aviation obstacles if an airplane at a low flying altitude is approaching and reaches the radius. The radius can for example be 4 km.

According to an advantageous development of the invention, the system has the following feature:
  a) the computer device is arranged to output the switch-on signals for the signal transmitters of such aviation obstacles that are disposed in different, non-intersecting and non-mutually adjacent geographic areas, wherein
  b) the computer device is arranged to switch on the signal transmitters of the aviation obstacles selectively in the respective geographic area depending on whether an airplane at a low flying altitude is approaching the respective geographic area.

This has the advantage that by means of the computer device, selective control of the signal transmitters of the aviation obstacles can be carried out depending on the aviation activity in relation to the geographic area in each case, i.e. the surroundings, of the respective aviation obstacle. This enables central management of the control of the signal transmitters of aviation obstacles that are disposed in a widely distributed manner.

According to an advantageous development of the invention, the computer device is arranged to segment the provided data about airplanes in the detected region according to geographic areas and to output switch-on signals to individual aviation obstacles and/or individual groups of aviation obstacles based on the segmentation of the data. In this way, the selective actuation of the signal transmitters of aviation obstacles that are disposed in a very widely distributed manner can be controlled automatically.

According to an advantageous development of the invention, the computer device is arranged to transmit the switch-on signals for the signal transmitters in a security-encoded form, in particular with a code with alternating keys. In this way, listening to and manipulation of the switch-on signals can be inhibited.

In addition to the previously described great technical and economic potential of the invention for the area of the actuation of signal transmitters on aviation obstacles, the invention has great significance for the provision of data about airplanes at low flying altitudes in a general way. The aforementioned object is therefore also achieved according to claim 5 by a system for providing data about airplanes at low flying altitudes, with the following features:

a) at least one large-area radar system that is arranged for the detection of airplanes at low flying altitudes and that is disposed at a point that is remote from aviation obstacles, b) at least one computer device that is coupled to the large-area radar system for signal transmission and that is arranged for analysis of the data provided by the large-area radar system about detected airplanes and for providing such data to other systems via a data connection, c) at least one data connection between the computer device and other systems, d) wherein the computer device is arranged to give the other systems information about the presence of airplanes at a low flying altitude in the vicinity of the respective system depending on the data transmitted by the large-area radar system.

In this way, the implementation of a general Information service about aviation activities at low flying altitudes is possible. The computer device can provide the data to other systems, for example via a publicly accessible network, in particular the Internet. The data can for example be provided in the context of a service agreement. The information about the presence of airplanes can be advantageously used by diverse users, for example by pilots of sports airplanes, to whom for example the occupancy of the relevant airspace, in particular at low flying altitudes, can be displayed in real time by means of a display unit carried in the airplane. This was not possible with previous radar monitoring.

A further advantageous application for the information service described above about aviation activities is monitoring for large flocks of birds, in particular migratory birds. By means of the large-area radar system, flocks of birds of this type can be reliably detected. The data acquired thereby can be used to temporarily turn off wind power systems in the region of the detected flock of birds so that they are not a hazard for the birds. In this way, further locations for the construction and operation of wind power systems can be accessible, which could not be used previously for reasons of nature conservation.

According to an advantageous development of the invention, the computer device can be arranged to give the other systems information about the presence of airplanes at a low flying altitude in the vicinity of the respective system depending on the current position thereof and depending on the data transmitted by the large-area radar system. For this purpose, information about the current position of the respective system to which the information is to be provided is transmitted to the computer device. The computer device matches said position information with the corresponding data of the large-area radar system and transmits to the other system information about the presence of airplanes, for example in a certain radius about the respective current position thereof.

According to an advantageous development of the invention, the large-area radar system is arranged for the detection of airplanes at flying altitudes down to at least 150 m, i.e. from a higher detection limit, which can lie at 1000 or 2000 m for example, down to 150 m. According to an advantageous development, the large-area radar system is even arranged for the detection of airplanes at flying altitudes down to 100 m or 50 m. In this way, even low-flying helicopters can be detected.

According to an advantageous development of the invention, the large-area radar system, in particular an individual radar station of the large-area radar system, can be arranged for the detection of an area of at least 5000 km$^2$. In this way, with a single large-area radar system and hence with one or a few radar stations, a large area of the order of a North German state can be detected. The radar stations are set up at particularly suitable geographic locations for this, in particular in elevated positions. For this purpose, natural terrain properties can be used, such as for example elevated terrain (hills or mountains).

The large-area radar system can comprise a plurality of radar stations, in particular radar stations disposed spaced far apart from each other (more than 100 km distance between the radar stations), which are connected to each other and/or to the computer device for the exchange of data. The large-area radar system can alternatively or additionally also comprise radar stations that are installed close to each other, for example in the center of the region to be detected.

For the switch-on signals transmitted by the computer device to an aviation obstacle, local processing thereof on the aviation obstacle is necessary. This means that the signal transmitter of the aviation obstacle or a suitable signal transmission unit with an electronic controller must be able to detect and analyze the switch-on signals. It is possible to upgrade or convert the corresponding signal transmitters or signal transmission units for this purpose.

Therefore, the aforementioned object according to claim 10 is also achieved by a device with a signal transmission unit for aviation obstacles, which are obstacles for low-flying airplanes and which comprise signal transmitters for optically warning the airplanes or the pilots thereof, wherein the signal transmission unit comprises at least one electronic controller and at least one visual signal transmitter controlled by the electronic controller, wherein the device additionally comprises an actuating unit that is arranged for switching off and on the electrical power supply of the signal transmission unit or of the electronic controller thereof.

This has the advantage that the upgrade or conversion cost of the signal transmitters or signal transmission units can be minimized. Said devices do not have to be newly developed or modified, depending on the type and the design of the respective manufacturer. Instead of this, a relatively simply and inexpensively constructed actuating unit in the sense of an intermediate adapter can be coupled into the electrical power supply of the signal transmission unit or of the electronic controller thereof. The function of the signal transmission unit can then be switched off or on by the actuating unit as required by controlling the electrical power supply.

The actuating unit is arranged to detect switch-on signals that are transmitted externally via a data connection and depending on switch-on signals to control the switching off or on of the electrical power supply of the signal transmission unit or of the electronic controller thereof.

According to an advantageous development of the invention, the actuating unit is arranged for simulation of data and/or signals that are output by the signal transmission unit when the signal transmitter is being supplied with electrical energy. This has the advantage that erroneous detection occurring as a result of manipulation of the electrical power supply of the signal transmission unit or of the electronic controller thereof can also be intercepted by the actuating unit at the same time. In this way, unnecessary maintenance costs resulting from false fault messages to the aviation obstacles can be avoided.

The actuating unit can additionally be arranged to carry out self-fault detection, and in the event of the occurrence of a fault to output a self-fault message, for example to a controller of the aviation obstacle.

The actuating unit can additionally be arranged to store some or all of the data that it receives, in particular the switch-on signals for the signal transmitter, for a defined period of time in the context of data logging.

The aforementioned object is therefore also achieved according to claim 12 by an actuating unit of a device of the type described above.

According to an advantageous development of the invention, it is provided that the system according to the invention and/or the device according to the invention with the signal transmission unit comprises a receiver for receiving transponder signals from airplanes and is further arranged to use received transponder signals to additionally use the data detected by the large-area radar system for the detection of airplanes at low flying altitudes in order to output switch-on signals for signal transmitters of aviation obstacles. In this way, the reliability of detection of low-flying airplanes can be further increased, in particular at points at which obscuration of radar signals is to be expected. Thus, in particular helicopters that are landing within a wind farm can be detected with the aforementioned development.

The transponder data can also be used to filter out airplanes flying above the altitude that is subject to detection, for example commercial aircraft at cruising altitude or in any case above 600 m flying altitude. In this way, airplanes that may be detected as relevant because of the radar data, but which are actually at greater altitude (so-called false positives), can be reduced and unnecessarily frequent switching on of the signal transmitter can be reduced.

The transponder signals used for this purpose can be transponder signals that are transmitted in the broadcast mode, i.e. signals that are output by the transponders without a particular demand, for example DF17 signals that are transmitted in the ADS-B service. Other transponder signals can also be analyzed, for example signals that are transmitted on demand, for example transponder signals that are transmitted on the basis of radar signals.

For this purpose, a receiver for transponder signals can be provided locally in the vicinity of the wind farm, i.e. in the vicinity of the device with the signal transmission unit and the actuating unit. The receiver for transponder signals can in particular be part of the actuating unit. Alternatively or additionally, the system for the actuation of signal transmitters, which comprises the large-area radar system, can also comprise a receiver for transponder signals. In this case, the transponder signals do not have to be received directly from the airplanes by the system according to the invention or the device according to the invention with the signal transmission unit. Indirect reception, for example by means of the provision of transponder data via an Internet service, can also be implemented advantageously.

According to an advantageous development of the invention, it is provided that the system, in particular the computer device thereof, is arranged to output shut-off signals for shutting off wind power systems depending on the data transmitted by the large-area radar system and/or further data characterizing airplanes at low flying altitudes. Further, the actuating unit can also be arranged to shut off a wind power system associated with the actuating unit, at least to the extent that that rotor comes to a standstill. For this purpose, the actuating unit can receive and use the aforementioned shut-off signals for shutting off wind power systems and/or can produce such shut-off signals locally, for example by receiving the transponder signals locally.

The invention is described in detail below using exemplary embodiments and drawings.

In the figures

In the figures, the same reference characters are used for mutually corresponding elements. In all figures, the system according to the invention and components thereof are represented schematically.

Figure 1:
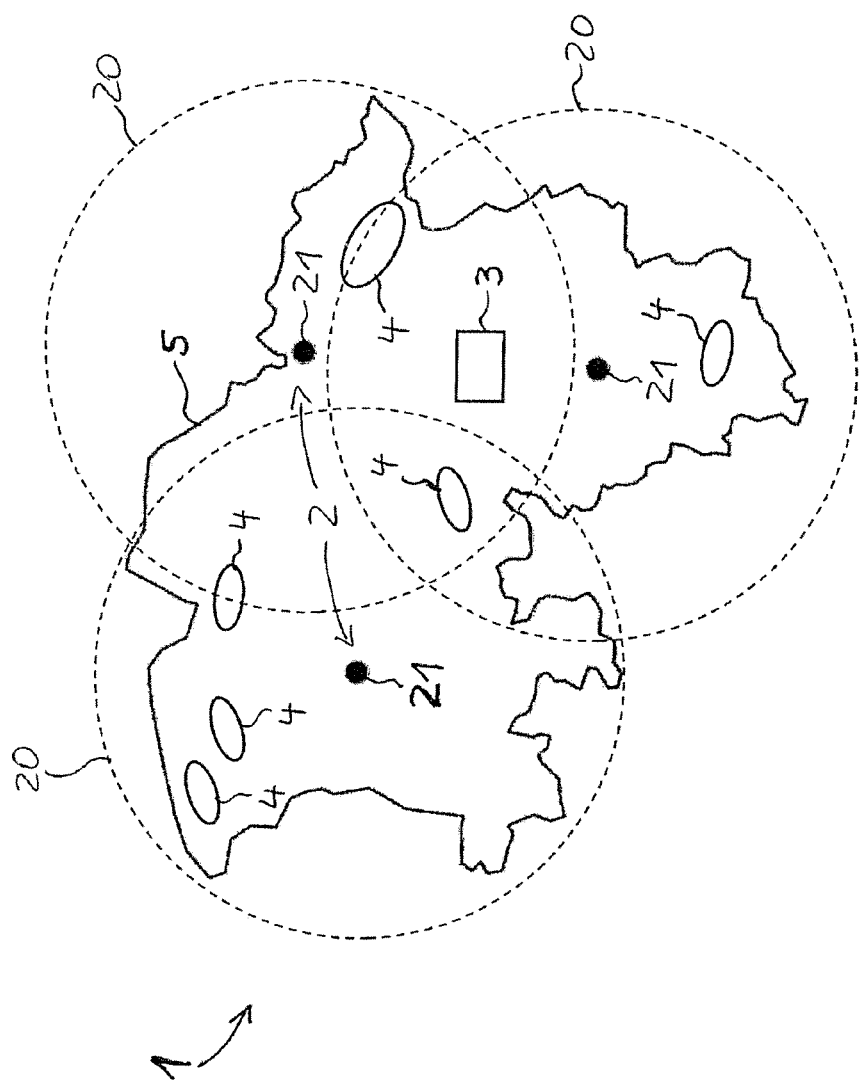
FIG. 1 shows a bird's-eye view of the system according to the invention.

FIG. 1 shows a system 1 for actuating signal transmitters that are disposed on aviation obstacles. The system 1 can also be used as a system for providing data about airplanes at low flying altitudes in order to implement a general information service. Accordingly, the following description applies to both applications. The system 1 comprises a large-area radar system 2 that comprises three radar stations 21 that are disposed in a spatially distributed manner in the exemplary embodiment shown. Each radar station 21 has a detection region 20 in which airplanes at low flying altitudes can be detected by means of radar. It is shown by way of example how the radar stations 21 in a German federal state 5, here using the outline of Lower Saxony by way of example, can be disposed distributed at long distances from each other in order to monitor a large area with a small number of radar stations, in particular a whole federal state 5.

The system further comprises a computer device 3 that is coupled to the large-area radar system 2, so that data about low-flying airplanes detected by the large-area radar system 2 or the individual radar stations 21 can be collected and analyzed in the computer device 3. The computer device 3 is further connected to other systems via a data connection, for example to aviation obstacles, which are represented in FIG. 1 by way of example using wind farms that are disposed locally distributed in respective areas 4. In each area 4, one or more wind power systems can be provided, each of which are aviation obstacles and accordingly must comprise signal transmitters for warning airplanes or the pilots thereof.

In this case, the feature can be seen that the aviation obstacles or other devices that are provided with the data about low-flying airplanes that are detected by the large-area radar system 2 can be arbitrarily distributed over the region detected by the large-area radar system 2, i.e. in particular do not have to be disposed immediately next to or very near the individual radar stations 21 or the computer device 3. Furthermore, the computer device 3 does not necessarily have to be disposed at one of the radar stations 21, however this can also be the case in individual cases, for example for better use of space.

The computer device 3 is arranged to output switch-on signals for the signal transmitters of such aviation obstacles that an airplane is approaching at a low flying altitude, depending on the data transmitted by the large-area radar system 2. Alternatively or additionally, the computer device 3 can be arranged to give one or more other systems information about the presence of airplanes at a low flying altitude in the vicinity of the respective system, depending on the data transmitted by the large-area radar system 2. Thus, for example, the data transmitted by the large-area radar system or the data analyzed by the computer device and provided to other users, i.e. to other systems, can be provided via the Internet.

The type of the data connection between the radar stations 21 and/or to the computer device 3 and the type of the data connection between the computer device 3 and the other systems or the aviation obstacles can in principle be of any type, for example a cable connection, a wired connection, for example using existing infrastructures, or even using wireless networks such as for example mobile radio networks (mobile telephone networks).

Figure 2:
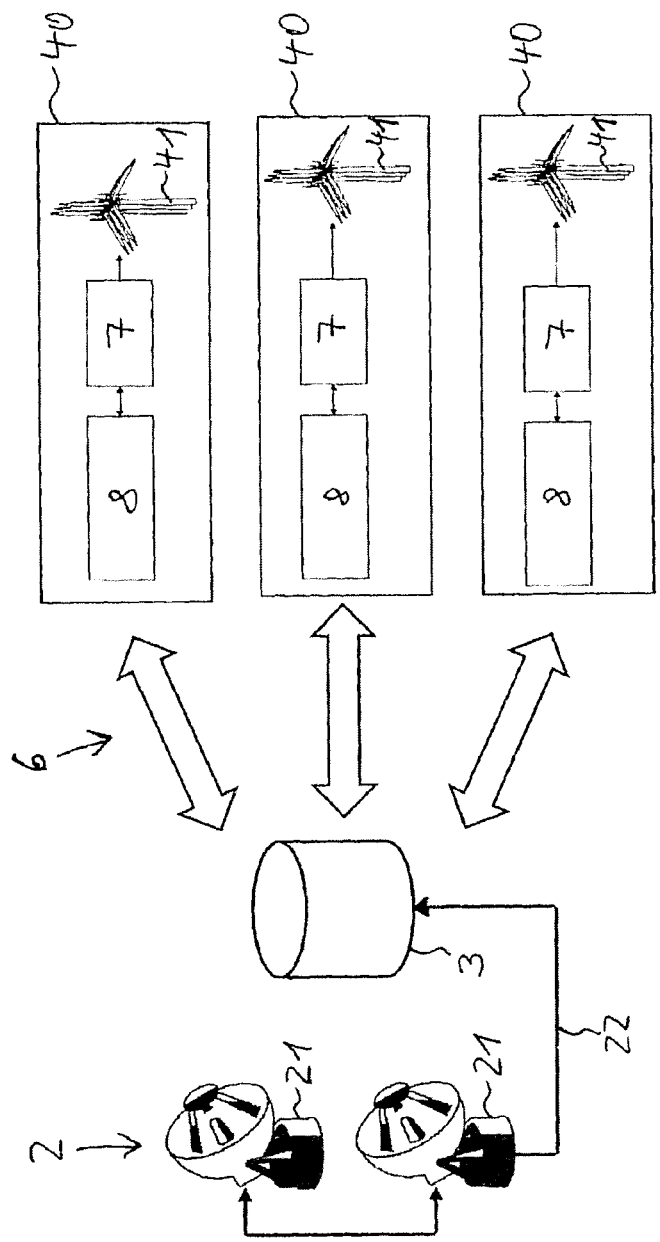
FIG. 2 shows the system with a first embodiment of the data transmission and FIG. 3 shows the system with a second embodiment of the data transmission and FIG. 4 shows a device with a signal transmission unit and an actuating unit.

Using FIG. 2, an example of a first embodiment of the system according to the invention 1 is shown, in which the distribution of the switch-on signals provided by the computer device 3 for the signal transmitters of the aviation obstacles is carried out in the form of a distribution by means of a web service, for example via a WAN connection. For this purpose, the data acquired with the large-area radar system 2 about an Internet connection 22, which is for example implemented redundantly, are fed to the computer device 3. The computer device 3 can for example comprise a server that is implemented redundantly and that carries out a web service. The computer device 3 determines for example a respective astronomical time depending on the location of each monitored area and switches the signal transmitters of aviation obstacles 41, for example wind power systems, via a data connection 6, for example in the form of push notifications. For this purpose, each aviation obstacle 41 or at least each group 40 of aviation obstacles 41, must have a suitable data connection to the data connection 6, for example an Internet connection. Said Internet connection can be made via an interface unit 8 that is disposed in the vicinity of the aviation obstacle 41 or the group 40 of aviation obstacles 41. The interface unit 8 can for example be a UMTS modem in order to make the data connection by means of mobile radio, or a DSL modem or a router in order to make a data connection by means of ADSL. An actuating unit 7 that is coupled to the interface unit 8 and that is also disposed in the vicinity of the aviation obstacle 41 or the group 40 of aviation obstacles 41, as is the interface unit 8, can subscribe to a web service from the computer device 3 via said data connection. The computer device 3 can then transmit the subscribed data or the switch-on signals for the signal transmitters of the respective aviation obstacles 41, for example cyclically, for example at time intervals of 500 ms.

To guard against faults, for example when the data connection 6 is interrupted, the actuating unit 7 can determine that there is a fault, for example by time monitoring, and in such cases can automatically switch on the signal transmitter of the aviation obstacle as a precaution.

Figure 3:
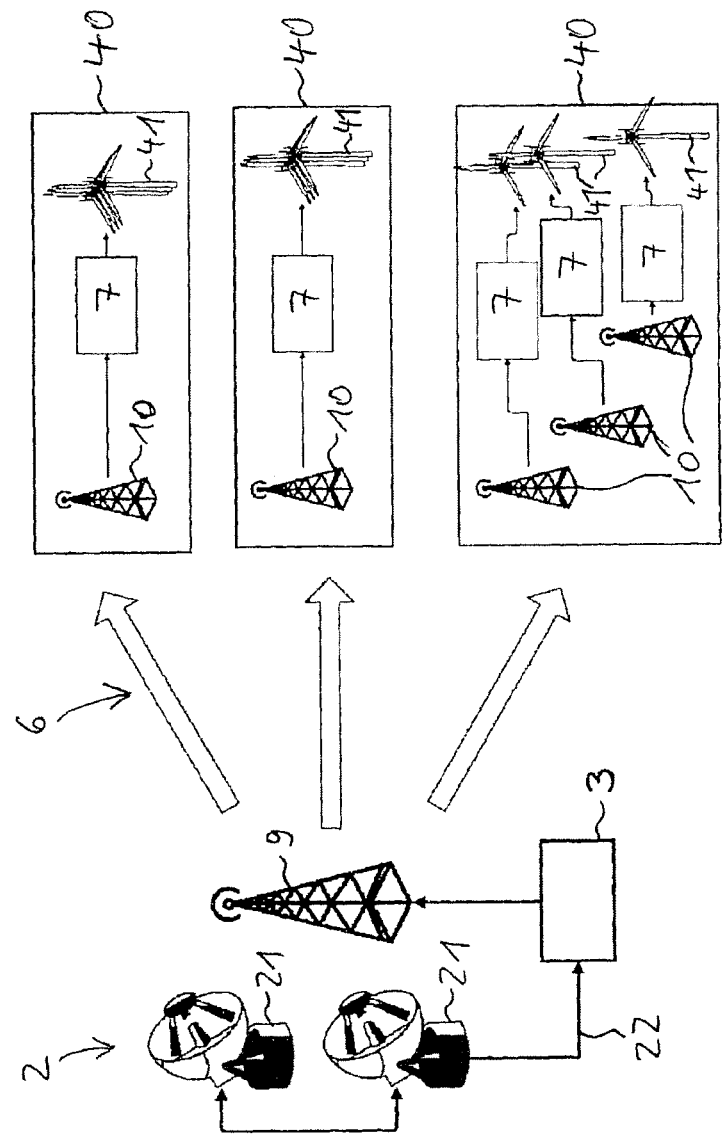

FIG. 3 shows an embodiment of the system 1, with which the data connection 6 is made via a radio connection, for example by long-range radio. For this purpose, the computer device 3 is connected to a radio transmitter 9. In addition, for example a unit that converts the data to be transmitted into a radio telegram is disposed in the vicinity of the computer device 3. In the vicinity of the respective aviation obstacle 41 or the group 40 of aviation obstacles 41, a respective radio receiver 10 is provided, to which the actuating unit 7 or the actuating units 7 is/are coupled. Compared to the embodiment according to FIG. 2, in this case no external central infrastructure is necessary. The computer device 3 can accordingly also be implemented in a distributed form as individual computer devices in the vicinity of the respective radar station 21. Likewise, a radio transmitter 9 can be installed directly on the radar system 2 and for example can transmit the necessary data about the data connection 6 unidirectionally by broadcast.

The transmission of the data via the data connection 6 can for example be carried out in such a way that a radio telegram is sent cyclically from the radio transmitter 9 to the radio receivers 10, for example at time intervals of 500 ms. In the case of a known position of the respective radio receiver 10, the radio path can also be embodied as a directional radio path in order to achieve a long range.

To achieve long range, a transmission frequency in the VHF region or at a lower frequency can be used for the radio connection.

Figure 4:
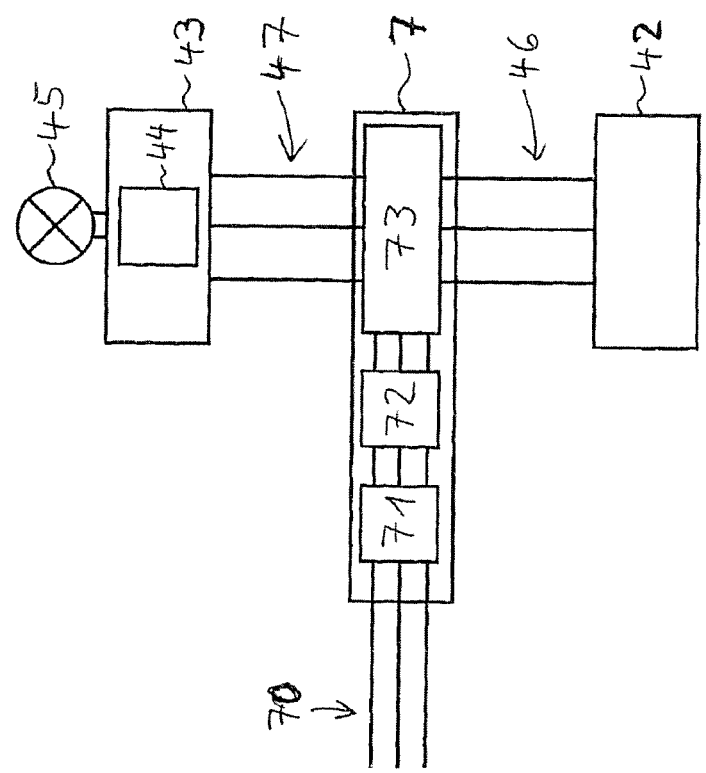

FIG. 4 shows by way of example the upgrade of an already existing aviation obstacle 41 by means of an actuating unit 7. The aviation obstacle 41 comprises a signal transmission unit 43 that comprises an electronic controller 44 and an optical signal transmitter 45, for example in the form of a light. The signal transmission unit 43 can in principle output the optical warning signals by means of the signal transmitter 45 independently of other devices of the aviation obstacle. In many cases, in particular in the case of wind power systems, the signal transmission unit 43 is coupled via cable connections 46, 47 to a monitoring and control system 42 of the aviation obstacle 41. In this way, safety control of the signal transmission unit 43 is carried out by the monitoring and control system 42. The signal transmission unit 43 thus comprises for example a fault signal output and/or a warning output, for example in the form of floating switch contacts. By this means, the monitoring and control system 42 can monitor the correct operation and the state of the signal transmission unit 43. In order to upgrade an existing system of this type for external control by means of the switch-on signals that are provided by the computer device 3, it is proposed to wire an actuating unit 7 into the cable connections 46, 47. As a result, the retrofitting cost is relatively low, especially as electrical plug connections to the cable connections 46, 47 are already present as a rule, and can be easily decoupled and connected to corresponding compatible plug connections of the actuating unit 7.

The actuating unit 7 comprises for example a power supply and communications part 71, control electronics 72 and a switching device 73. Electrical energy and data are fed from the computer device 3 to the actuating unit 7, for example via electrical lines 70. Alternatively or additionally, the actuating unit 7 can also be coupled to an antenna in order to receive the data transmitted by the computer device 3 wirelessly. Provision of the corresponding required supply voltage for the control electronics 72 is carried out in the power supply and communications part 71. Moreover, the data received by the computer device 3 are prepared for use in the control electronics 72, for example by means of a radio modem.

The control electronics 72 control the switching device 73. The switching device 73 is embodied in such a way that the mutually separated cable connections 46, 47 can each be individually switched on, off and/or over by the actuating unit 7, so that thereby all signals provided by the signal transmission unit 43, which are normally transmitted to the monitoring and control system 42, can be replicated or can be artificially produced by the actuating unit 7. In addition, the electrical power supply of the signal transmission unit 43, which is also delivered via the cable connections 46, 47, can be interrupted or switched on by means of the switching device 73.

The switching device 73 can for example be embodied with a suitable relay, fuses or semiconducting switches for this.

The invention claimed is:

1. A system for actuating signal transmitters that are disposed on aviation obstacles that are obstacles for low-flying airplanes, wherein the signal transmitters are used for optically warning the low flying airplanes or the pilots thereof, comprising:
   a) at least one large-area radar system that is arranged for detection of airplanes at low flying altitudes and that is disposed at a point that is remote from the aviation obstacles,
   b) at least one computer device that is coupled to the large-area radar system for signal transmission and for analysis of data about detected airplanes provided by the large-area radar system and for providing such data to other systems,
   c) at least one data connection between the at least one computer device and one or more of the aviation obstacles and/or groups of the aviation obstacles,
   d) wherein the at least one computer device is arranged to output switch-on signals for the signal transmitters of such aviation obstacles that are being approached by an airplane at a low flying altitude, depending on the data transmitted by the large-area radar system.

2. The system as claimed in claim 1 wherein the at least one computer device is arranged to monitor different, non-intersecting and non-mutually adjacent geographic areas for airplanes at a low flying altitude using the data transmitted by the large-area radar system.

3. The system as claimed in claim 2 having the following features:
   a) the at least one computer device is arranged to output the switch-on signals for the signal transmitters of such aviation obstacles that are disposed in different, non-intersecting and non-mutually adjacent geographic areas, the at least one computer device is arranged to switch on the signal transmitters of the aviation obstacles selectively in the respective geographic area depending on whether an airplane at a low flying altitude is approaching the respective geographic area.

4. The system as claimed in claim 1 wherein the at least one computer device is arranged to segment the data provided about airplanes in the detected region according to geographic areas, and based on the segmentation of the data the at least one computer device is arranged to output switch-on signals to individual aviation obstacles and/or individual groups of aviation obstacles.

5. A system for providing data about airplanes at low flying altitudes, comprising:
   a) at least one large-area radar system arranged for detection of airplanes at low flying altitudes and that is disposed at a point that is remote from aviation obstacles,
   b) at least one computer device coupled to the large-area radar system for signal transmission and for analysis of the data provided by the large-area radar system about detected airplanes and for providing such data to other systems,
   c) at least one data connection between the computer device and the other systems, wherein the data connection is configured to direct data from the at least one computer device to the other systems,
   d) wherein the at least one computer device arranged to provide the other systems with information about the presence of airplanes at a low flying altitude in the vicinity of the respective aviation obstacle depending on the data transmitted by the large-area radar system.

6. The system as claimed in claim 5 wherein the large-area radar system is arranged for detection of airplanes at flying altitudes down to at least 150 meters.

7. The system as claimed claim 5 wherein the large-area radar system is arranged for the detection of an area of at least 5000 km$^2$.

8. The system as claimed in claim 5 wherein the large-area radar system comprises a plurality of radar stations that are connected to each other and/or to the at least one computer device for the exchange of data.

9. The system as claimed in claim 5 wherein the at least one computer device is arranged to output shut-off signals for shutting off wind power systems depending on the data transmitted by the large-area radar system and/or other data characterizing airplanes at low flying altitudes.

10. A device comprising
    a signal transmission unit for aviation obstacles that are obstacles for low-flying airplanes and that comprise signal transmitters for optically warning the low-flying airplanes or the pilots thereof, wherein the signal transmission unit comprises at least one electronic controller and at least one optical signal transmitter controlled by the electronic controller, and
    an actuating unit comprising a switching device configured to switch for off and on an electrical power supply of the signal transmission unit or of the electronic controller thereof.

11. The device as claimed in claim 10 wherein the actuating unit comprises control electronics configured to replicate of data and/or signals that are output by the signal transmission unit when the signal transmission unit is supplied with electrical energy.

12. An actuating unit of a device as claimed in claim 10.

13. The system as claimed in claim 1 wherein the large-area radar system is arranged for detection of airplanes at flying altitudes down to at least 150 meters.

14. The system as claimed claim 1 wherein the large-area radar system is arranged for the detection of an area of at least 5000 km².

15. The system as claimed in claim 1 wherein the large-area radar system comprises a plurality of radar stations that are connected to each other and/or to the at least one computer device for the exchange of data.

16. The system as claimed in claim 1 wherein the at least one computer device is arranged to output shut-off signals for shutting off wind power systems depending on the data transmitted by the large-area radar system and/or other data characterizing airplanes at low flying altitudes.

* * * * *